US012380849B2

(12) United States Patent
Liu et al.

(10) Patent No.: US 12,380,849 B2
(45) Date of Patent: Aug. 5, 2025

(54) DISPLAY PANEL, DISPLAY MODULE, AND DRIVING METHOD

(71) Applicant: Hubei Yangtze Industrial Innovation Center of Advanced Display Co., LTD., Wuhan (CN)

(72) Inventors: Xigang Liu, Wuhan (CN); Entong Wang, Wuhan (CN)

(73) Assignee: Hubei Yangtze Industrial Innovation Center of Advanced Display Co., LTD., Wuhan (CN)

( * ) Notice: Subject to any disclaimer, the term of this patent is extended or adjusted under 35 U.S.C. 154(b) by 0 days.

(21) Appl. No.: 18/407,030

(22) Filed: Jan. 8, 2024

(65) Prior Publication Data

US 2024/0404465 A1 Dec. 5, 2024

(30) Foreign Application Priority Data

May 31, 2023 (CN) ........................ 202310649720.X

(51) Int. Cl.
*G09G 3/3233* (2016.01)

(52) U.S. Cl.
CPC ... *G09G 3/3233* (2013.01); *G09G 2320/0233* (2013.01); *G09G 2330/021* (2013.01)

(58) Field of Classification Search
CPC ......... G09G 3/3233; G09G 2320/0233; G09G 2330/021
See application file for complete search history.

(56) References Cited

U.S. PATENT DOCUMENTS

| | | | | |
|---|---|---|---|---|
| 9,886,896 | B2 * | 2/2018 | Zhang | G09G 3/3208 |
| 11,373,592 | B2 * | 6/2022 | Liu | G09G 3/3208 |
| 2008/0030177 | A1 * | 2/2008 | Chen | G05F 1/46 323/282 |
| 2013/0063116 | A1 * | 3/2013 | Sun | H03K 17/302 327/434 |
| 2013/0241507 | A1 * | 9/2013 | Hara | H02M 3/156 323/282 |
| 2016/0111061 | A1 * | 4/2016 | Thenus | G09G 5/006 327/284 |
| 2021/0181847 | A1 * | 6/2021 | Noh | G06F 3/0412 |
| 2022/0216599 | A1 * | 7/2022 | Cao | H01Q 1/243 |
| 2022/0384558 | A1 * | 12/2022 | Xu | H10K 59/131 |
| 2023/0298493 | A1 * | 9/2023 | Pyun | G09G 3/22 |
| 2024/0106330 | A1 * | 3/2024 | Nam | G09G 3/2096 |

FOREIGN PATENT DOCUMENTS

| | | |
|---|---|---|
| CN | 104933987 A | 9/2015 |
| CN | 111402805 A | 7/2020 |

* cited by examiner

*Primary Examiner* — Doon Y Chow
(74) *Attorney, Agent, or Firm* — Anova Law Group, PLLC

(57) ABSTRACT

Display panel, display module and driving method are provided. The display panel includes a power management chip, a power signal line loading an electrical signal based on the power management chip, a current detection module, a gate control module, and an optional load module. The gate control modules is connected between the optional load module and the power signal line, and the optional load module is controlled by the gate control module and connected to the power signal line. The current detection module is configured to detect a first current loaded on the power signal line and control the gate control module to be turned on to connect the optional load module to the power signal line when the first current is less than a set threshold.

20 Claims, 13 Drawing Sheets

DISPLAY PANEL, DISPLAY MODULE, AND DRIVING METHOD

CROSS-REFERENCE TO RELATED APPLICATION

This application claims priority of Chinese Patent Application No. 202310649720.X, filed on May 31, 2023, the entire contents of which are hereby incorporated by reference.

FIELD OF THE DISCLOSURE

The present disclosure generally relates to the field of display technology and, more particularly, relates to a display panel, a display module, and a driving method.

BACKGROUND

Organic light emitting diode (OLED) is a current-type light-emitting device, which is widely used in display devices such as mobile phones, tablet computers, due to OLED's characteristics of self-illumination, fast response, wide viewing angle, and ability to be formed on flexible substrates.

In different application scenarios, an OLED display panel of a display device can display images with different refresh rates for various arrangements. Exemplarily, in application scenarios where dynamic images are displayed in games, videos and the like, OLED display panels adopt a high-frequency mode. In the high-frequency mode, an OLED display panel adopts a relatively high image refresh rate for display to ensure a smoothness of a displayed image. In application scenarios where static images are displayed such as e-books, OLED display panels adopt a low-frequency mode. In the low-frequency mode, an OLED display panel adopts a relatively low image refresh rate to reduce power consumption of the OLED display panel. However, under a small current driving scenario in the low-frequency mode, a power management chip may enter a pulse frequency modulation (PFM) mode. A voltage on a power signal line may fluctuate, resulting in differences in brightness of a display screen, forming display ripples and affecting a display effect.

BRIEF SUMMARY OF THE DISCLOSURE

One aspect of the present disclosure provides a display panel. The display panel includes a power management chip, a power signal line loading an electrical signal based on the power management chip, a current detection module, a gate control module, and an optional load module. the gate control module is connected between the optional load module and the power signal line, and the optional load module is controlled by the gate control module and connected to the power signal line. The current detection module is configured to detect a first current loaded on the power signal line and control the gate control module to be turned on to connect the optional load module to the power signal line when the first current is less than a set threshold.

Another aspect of the present disclosure provides a display module including a display panel. The display panel includes a power management chip, a power signal line loading an electrical signal based on the power management chip, a current detection module, a gate control module, and an optional load module. The gate control modules is connected between the optional load module and the power signal line, and the optional load module is controlled by the gate control module and connected to the power signal line. The current detection module is configured to detect a first current loaded on the power signal line and control the gate control module to be turned on to connect the optional load module to the power signal line when the first current is less than a set threshold.

Another aspect of the present disclosure provides a driving method applied to a display panel. The display panel includes a power management chip, a power signal line loading an electrical signal based on the power management chip, a current detection module, a gate control module, and an optional load module. The gate control modules is connected between the optional load modules and the power signal line, and the optional load module is controlled by the gate control module and connected to the power signal line. The current detection module is configured to detect a first current loaded on the power signal line and control the gate control module to be turned on to connect the optional load module to the power signal line when the first current is less than a set threshold. The driving method includes detecting a first current loaded on the power signal line based on the current detection module and controlling the gate control module to be turned on to connect the optional load module to the power signal line when the first current is less than the set threshold.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated into and constitute a part of the present specification, illustrate embodiments of the present disclosure and together with the description, serve to explain principles of the present disclosure.

To illustrate technical solutions of the embodiments of the present disclosure more clearly, the accompanying drawings required to describe the embodiments are briefly introduced below. Obviously, a person skilled in the art can obtain other drawings according to the accompanying drawings without creative efforts.

DETAILED DESCRIPTION

To understand the above purpose, features, and advantages of the present disclosure more clearly, solutions of the present disclosure will be further described below. It should be noted that, in case of no conflict, embodiments of the present disclosure n and the features in the embodiments can be combined with each other.

In the following description, many specific details are set forth to fully understand the present disclosure, but the present disclosure can also be implemented in other ways than described herein. The embodiments in the description are only some but not all the embodiments of the present disclosure.

Figure 1:
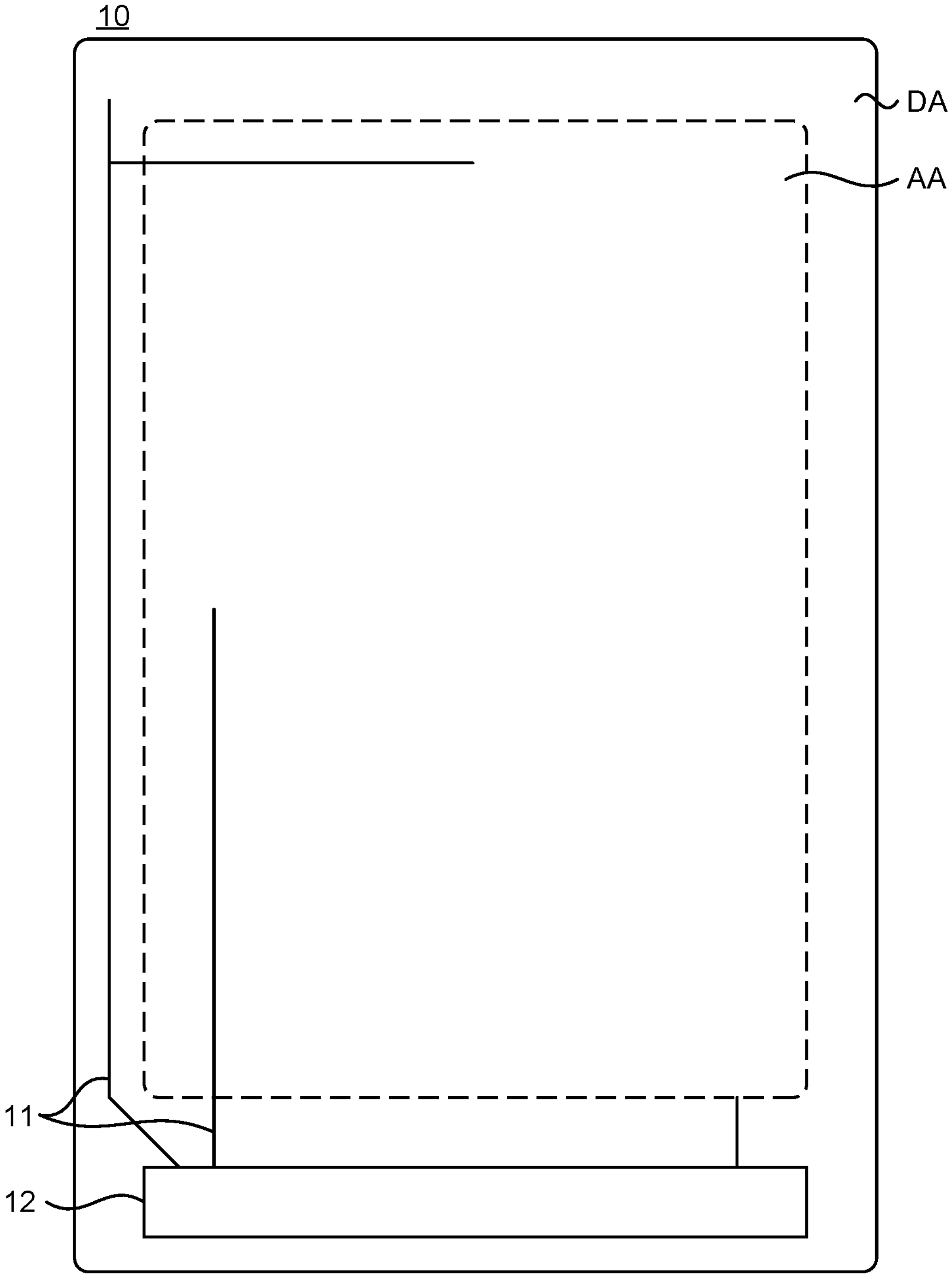
FIG. 1 illustrates a schematic diagram of a display panel consistent with various embodiments of the present disclosure.

FIG. 1 illustrates a schematic diagram of a display panel consistent with various embodiments of the present disclosure. Referring to FIG. 1, the display panel includes a display area AA and a non-display area DA arranged on at least one side of the display area AA. FIG. 1 exemplarily shows that the non-display area DA is arranged around the display area AA. In other embodiments, the non-display area DA can also be arranged on one side, adjacent two sides, opposite two sides, or any other combination of sides of the display area AA, which is not limited herein.

Exemplarily, the display area AA may include pixel areas arranged in an array. Each pixel area may be arranged with a pixel and a pixel driving circuit for providing a driving signal to the pixel and the pixel is controlled by the pixel driving circuit to emit light. Pixels arranged in the array cooperate to realize a display of a target display image.

Figure 2:
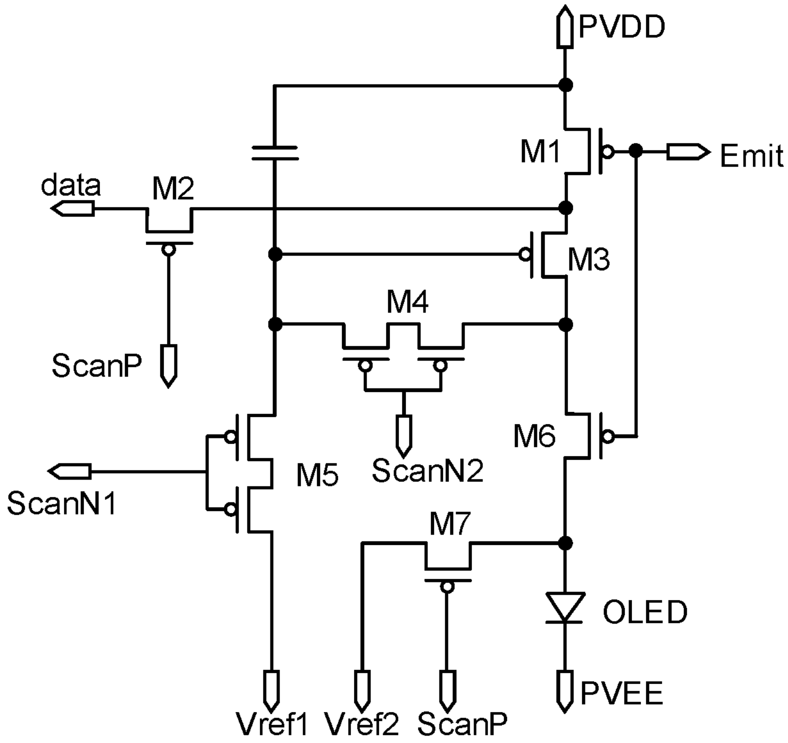
FIG. 2 illustrates a schematic diagram of a pixel driving circuit consistent with various embodiments of the present disclosure.
Figure 3:
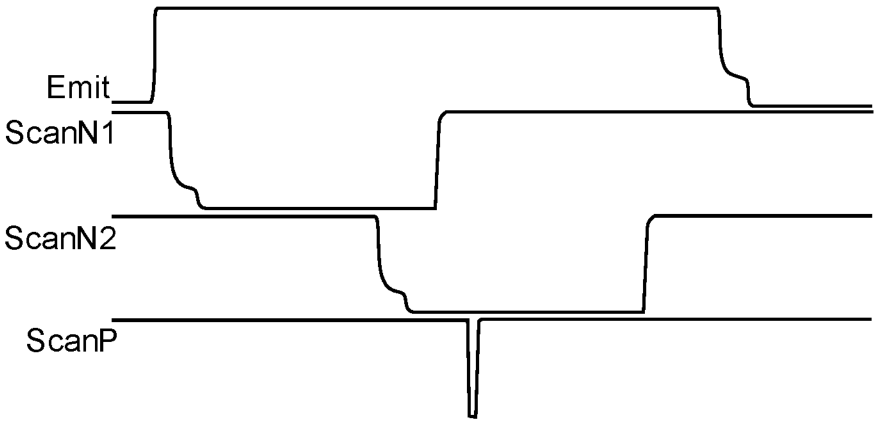
FIG. 3 illustrates a schematic diagram of a pixel driving timing consistent with various embodiments of the present disclosure.

Exemplarily, a structure of a pixel driving circuit may be as shown in FIG. 2, and a corresponding pixel driving timing may be as shown in FIG. 3. M1-M7 are all transistor switches (such as thin film transistors). ScanN1, ScanN2 and ScanP are all scanning signals, which are configured to turn on corresponding transistor switches at different stages in a scanning sequence to realize transmissions of corresponding signals. Emit is a light emitting control signal, data is a data signal, PVDD is a first power signal, PVEE is a second power signal, Vref1 is a first reference power signal, and Vref2 is a second reference power signal. Referring to FIG. 2 and FIG. 3, the transistor switches M1-M7 may all be low-level conduction switches. When ScanN1 is at a low level, ScanN1 corresponds to an initialization phase. When ScanN2 is at a low level, ScanN2 corresponds to a data writing phase. When ScanP is at a low level, ScanP uses a second reference power signal Vref2 to initialize an anode of an OLED, to avoid an influence of a previous frame on a display of a current frame. When Emit is at a low level, Emit corresponds to a light-emitting stage, that is, the OLED emits light, thereby realizing an OLED light-emitting control. It should be noted that M1-M7 can also be specifically selected as high-level conduction switches (e.g., N-type transistors), or partly high-level conduction switches and part of low-level conduction switches (e.g., P type transistor), which are not limited herein.

Scanning signals, light-emitting control signals and power signals are provided based on corresponding signal lines, which can extend from the non-display area DA to the display area AA and are connected to corresponding pixel driving circuits. The scanning signals and the lighting-emitting control signals can be provided by a shift register circuit, and the power signals can be provided by a power management chip (PMIC).

Exemplarily, referring to FIG. 1, the display panel 10 may further include a power signal line 11 and a power management chip 12. The power signal line 11 loads an electrical signal based on the power management chip 12 to transmit a corresponding power signal to a pixel driving circuit.

Exemplarily, in a related art, when an OLED display panel is under a light display load (e.g., 2nitL32) in the low-frequency mode, the PMIC will enter the PFM mode, and 720 hz ripples (ripple/fluctuation) are generated on the PVEE. A voltage fluctuation leads to frame brightness differences, thereby forming display ripples.

In view of the above, one embodiment provides a display panel. By connecting the optional load modules with a selectable gating control to the power signal line and using a current detection module to detect first currents loaded on the power signal line, when a first current is less than a set threshold, a gate control module is controlled to be turned on, so that an optional load module is connected to a power signal line. Therefore, a load is increased to prevent the power management chip from entering a pulse frequency modulation mode under a light image load, so that there is no fluctuation in the power signal, and there will be no brightness difference in the frame brightness, thereby eliminating display ripples and improving a display effect.

Figure 4:
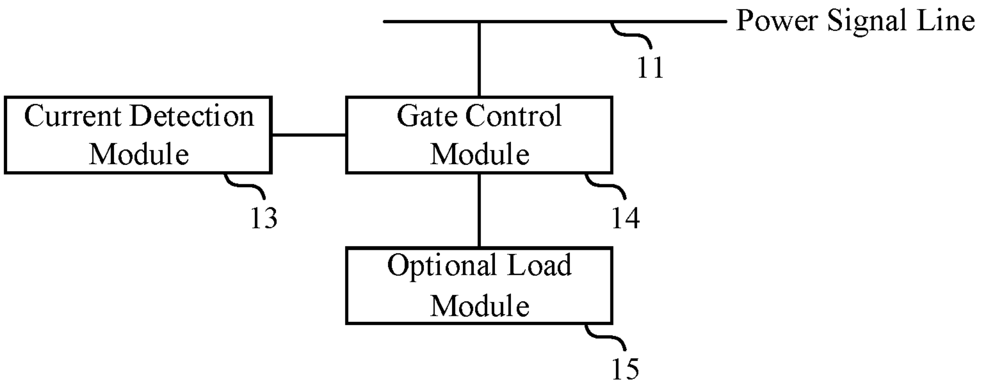
FIG. 4 illustrates another schematic diagram of a display panel consistent with various embodiments of the present disclosure.

Exemplarily, FIG. 4 illustrates another schematic diagram of a display panel consistent with various embodiments of the present disclosure. Referring to FIG. 1 and FIG. 4, the display panel 10 further includes a current detection module 13, a gate control module 14 and an optional load module 15. The gate control module 14 is connected between the optional load module 15 and a power signal line 11, and the optional load module 15 is controlled by the gate control module 14 and connected to the power signal line 11. The current detection module 13 is configured to detect a first current loaded on the power signal line 11 and control the gate control module 14 to be turned on when the first current is less than the set threshold, so as to connect the optional load module 15 to the power signal line 11.

The set threshold is configured to measure the size of the first current. When the first current is equal to or greater than the set threshold, indicating that the first current is relatively large, correspondingly, the OLED display panel can display normally without an additional connection to the optional load module 15. When the first current is less than the set threshold, indicating that the first current is relatively small, the current detection module 13 can control the gate control module 14 to be turned on to avoid possible display ripples, so that the optional load module 15 connected to the power signal line 11 to increase a load and prevent the power management chip 12 from entering the PFM mode, thereby avoiding a voltage fluctuation of the power signal, and eliminating the display ripples. A specific size of the set threshold can be arranged based on requirements of the display panel, which is not limited herein.

The optional load module 15 can be connected to the power signal line 11 selectively, specifically controlled by whether the gate control module 14 is turned on to connect to the power signal line 11 selectively. The gate control module 14 is controlled by the current detection module 13 to switch a turning-on state and a turning-off state.

In the display panel 10 provided by the embodiment, the current detection module 13 can detect the first current loaded on the power signal line 11, and control the gate control module 14 to be turned on when the first current is less than the set threshold, so as to connect the optional load module 15 to the power signal line 11, which is equivalent to increasing a load connected to the power signal line 11, so that the power management chip 12 can be prevented from entering the pulse frequency modulation mode under a light display load, so that there is no fluctuation in the power signal, and there will be no brightness difference in the frame brightness, thereby eliminating display ripples and improving the display effect.

In the above embodiment, the current detection module 13 can be a circuit module additionally provided on the basis of a structure of the display panel in a related art for detecting the first current loaded on the power signal line 11, and can also be implemented by using an original circuit modules in the display panel structure in the related art, which will be explained respectively in the following embodiments.

Figure 5:
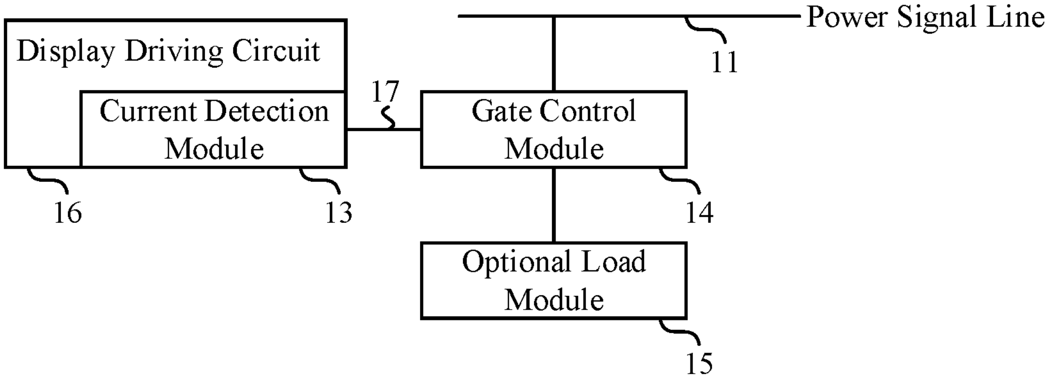
FIG. 5 illustrates another schematic diagram of a display panel consistent with various embodiments of the present disclosure.

FIG. 5 illustrates another schematic diagram of a display panel consistent with various embodiments of the present disclosure. In some embodiments, referring to FIG. 1 and FIG. 5, The display panel 10 further includes a display driving circuit 16. The current detection module 13 is arranged in the display driving circuit 16. The display driving circuit 16 self-tests the first current loaded on the power signal line 11 and controls the gate control module 14 to be turned on when the first current is less than the set threshold.

The display driving circuit 16 may include a power management chip, and the display driving circuit 16 has a current self-test function, which can detect the first current loaded by the power management chip 12 on the power signal line 11 and control whether the gate control module 14 is turned on or not based on the detected first current. Specifically, when the first current is less than the set threshold, the gate control module 14 is controlled to be turned on, and the optional load module 15 is connected to the power signal line 11. When the first current is equal to or greater than the set threshold, the gate control module 14 is controlled to be turned off, and the optional load module 15 is disconnected from the power signal line 11.

In the display panel provided by the embodiments, a detection of the first current is realized by using the current self-test function of the display driving circuit 16 without adding an additional circuit module with a current detection function, which saves a space required for circuit layout. Furthermore, using the display drive circuit 16 to detect the first current and directly output the control signal has high versatility, high precision, and fast signal feedback.

In some embodiments, a circuit module with a current detection function independent of the display driving circuit 16 can also be provided, such as an ammeter. Exemplarily, a jig ammeter outputs a control signal related to the first current with reference to the set threshold, to control whether the gate control module is turned on or not.

Figure 6:
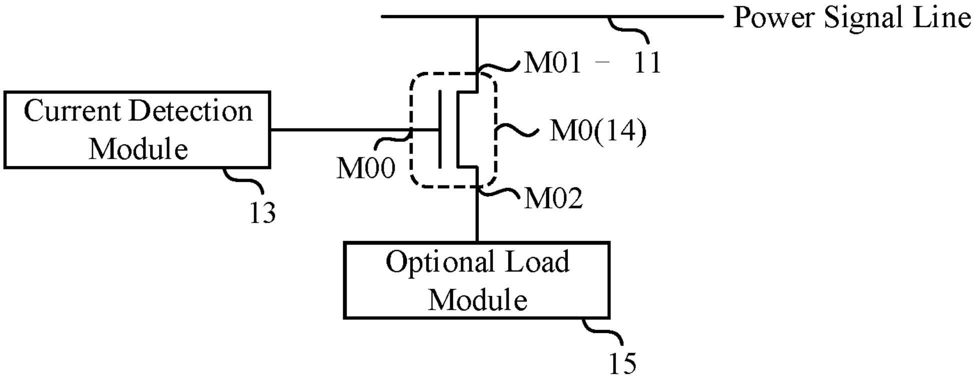
FIG. 6 illustrates another schematic diagram of a display panel consistent with various embodiments of the present disclosure.

FIG. 6 illustrates another schematic diagram of a display panel consistent with various embodiments of the present disclosure. In some embodiments, referring to FIG. 1 and FIG. 6, in the display panel, the gate control module 14 includes a controlled switch transistor M0. A control terminal M00 of the controlled switch transistor M0 is connected to a control signal output by the current detection module 13. A first terminal M01 of the controlled switch transistor M0 is connected to the power signal line 11 and a second terminal M02 of the switch tube M0 is connected to the optional load module 15. The controlled switch transistor M0 is configured to be turned on by a target control signal output by the current detection module 13, to connect the optional load module 15 and the power signal line 11.

Control signals output by the current detection module 13 may include a turning-on control signal and a turning-off control signal. The target control signal is a turning-on control signal. Specifically, when the detected first current is less than the set threshold, the current detection module 13 outputs the turning-on control signal to control a conduction between the first terminal M01 and the second terminal M02 of the controlled switch M0. That is, the gate control module 14 is turned on, and the optional load module 15 is connected to the power signal line 11.

Exemplarily, the controlled switch transistor M0 may be a metal-oxide-semiconductor field effect transistor, or other type of controlled switch transistors that can be integrated into a film structure of the display panel, such as a low-temperature polysilicon thin film transistors or a non-crystalline silicon thin film transistor. The controlled switch transistor M0 can be selected as an N-type or P-type transistor according to actual needs, which is not limited herein.

In the embodiments, by arranging the gate control module 14 to include the controlled switch transistor M0. Control of a selective connection between the optional load module 15 and the power signal line 11 is realized based on whether the controlled switch transistor M0 is turned on or not, and a switch control function can be realized based on a relatively simple structure of a circuit component, saving a space required for circuit layout. The controlled switch transistor M0 can be integrated easily with the film structure of the display panel without additionally increasing a film complexity of the display panel.

Figure 7:
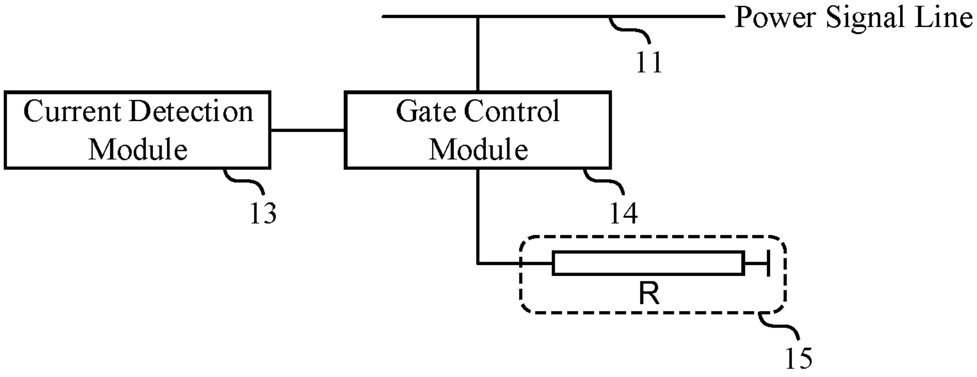
FIG. 7 illustrates another schematic diagram of a display panel consistent with various embodiments of the present disclosure.

FIG. 7 illustrates another schematic diagram of a display panel consistent with various embodiments of the present disclosure. In some embodiments, referring to FIG. 1 and FIG. 7, in the display panel 10, the optional load module 15 includes a resistor R. One end of the resistor R is connected to the gate control module 14, and the other end of the resistor R is connected to a fixed potential.

Exemplarily, the fixed potential may be grounded, that is, the other end of the resistor R may be grounded. The resistor is a relatively simple implementation circuit component for a load.

In one embodiment, a specific implementation of the optional load module 15 can be the resistor R, so that a load function of the optional load module 15 can be realized based on a relatively simple structure of a circuit component. The resistor R can be integrated easily with the film structure of the display panel without additionally increasing a film complexity of the display panel.

Figure 8:
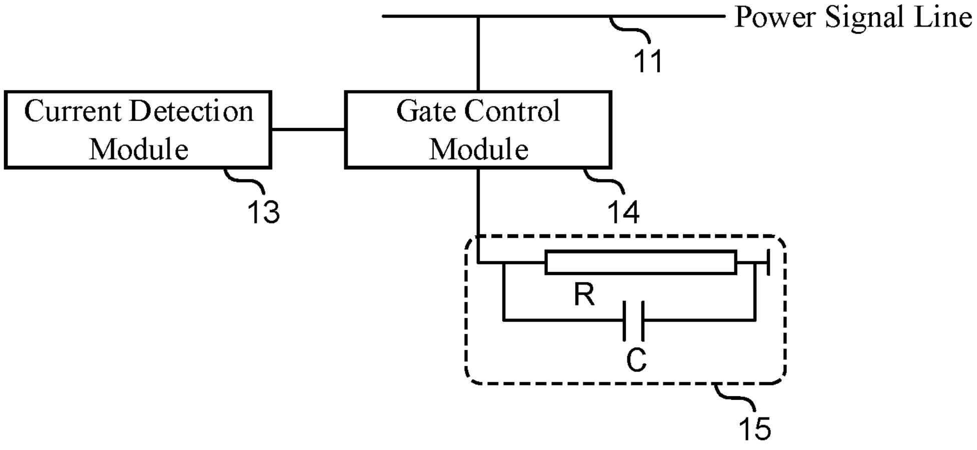
FIG. 8 illustrates another schematic diagram of a display panel consistent with various embodiments of the present disclosure.

FIG. 8 illustrates another schematic diagram of a display panel consistent with various embodiments of the present disclosure. In some embodiments, referring to FIG. 7 and FIG. 8, the optional load module 15 also includes a capacitor C connected to the resistor R in parallel. The capacitor C and the resistor R form an RC circuit to improve a stability of the optional load module 15.

Exemplarily, referring to FIG. 6 and FIG. 8, the gate control module 14 includes a controlled switch M0, which can be a transistor that is turned on at a low level and turned off at a high level. The optional load module 15 includes a resistor R and a capacitor C, i.e., RC. When the first current detected by the current detection module 13 is less than the set threshold, a conduction control signal output by the current detection module 13 may be a low-level signal, such as a VGL signal, the controlled switch transistor M0 is turned on, and the RC is connected to the power signal line 11. When the first current detected by the current detection module 13 is equal to or greater than the set threshold, a shutdown control signal output by the current detection module 13 may be a high-level signal, such as a VGH signal, the controlled switch transistor M0 is turned off, and the display panel works normally.

In other implementations, the controlled switch M0 can also be turned on based on a high-level signal and turned off based on a low-level signal, which is not limited herein.

In other embodiments, the gate control module 14 may also include other circuit component, which can realize a function of controlled switch; and/or the optional load module 15 can also include other circuit component, which can realize a loading function, which is not limited herein.

Figure 9:
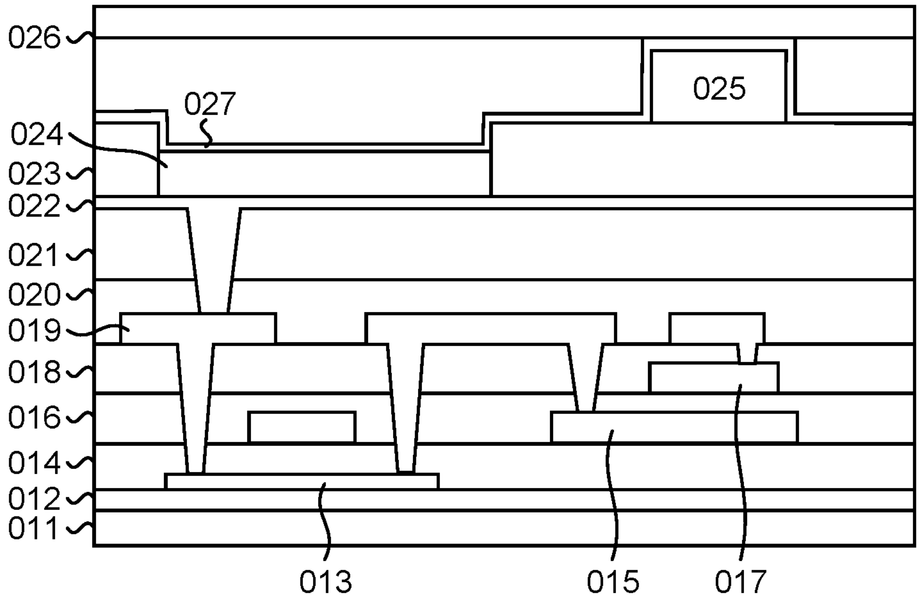
FIG. 9 illustrates another schematic diagram of a display panel consistent with various embodiments of the present disclosure.

FIG. 9 illustrates another schematic diagram of a display panel consistent with various embodiments of the present disclosure. In some embodiments, referring to FIG. 9, the display panel may include a base substrate 011, a buffer layer 012, an active layer 013, a gate insulating layer 014, a first metal layer 015, a capacitor insulating layer 016, a capacitor metal layer 017, an interlayer insulating layer 018, a second metal layer 019, a passivation layer 020, a planarization layer 021, a reflective metal layer 022, a pixel definition layer 023, a light emitting layer 024, a cathode layer 027, a support layer 025 and a protective layer 026. The active layer 013, the first metal layer 015, the capacitor metal layer 017, the second metal layer 019, and the reflective metal layer 022 can be configured as conductive layers for patterning to form conductive structures, such as at least one of signal lines, electrode layer for resistors, and capacitors.

In other embodiments, the display panel may also include any other suitable conductive layer, such as a conductive layer for power line replacement, which is not limited herein.

As such, for the optional load module 15 shown in FIG. 7 including a structure of the resistor R, the display panel 10 further includes a base substrate 011 and functional film layers stacked on one side of the base substrate 011. At least part of functional film layers configured to form the resistor R and functional film layers configured to form the power signal line 11 are arranged on a same layer.

Exemplarily, the functional film layer may be the conductive layer described above.

The functional film layers configured to form the power signal line 11 can be at least one of the above conductive layers, and the functional film layers configured to form the resistor R can be at least one of the above conductive layers. At least part of the functional film layers used to form the resistor R and the functional film layers used to form the power signal line 11 is arranged on a same layer. Exemplarily, the functional film layers configured to form the power signal line 11 includes at least a reflective metal layer 022, and the resistor R can be arranged in the reflective metal layer 022. Alternatively, number of the functional film layer configured to form the power signal line 11 and number of the functional film layer configured to form the resistor R are same. Positions of the functional film layer configured to form the power signal line 11 relative to the base substrate 011 and positions of the functional film layer configured to form the resistor R are same.

By sharing at least part of the film layers between the resistor R and the power signal line 11, full utilization of the film layers is realized, which is conducive to ensuring that an overall number of film layers of the display panel is small, thereby reducing number of corresponding processes.

In some embodiments, for the optional load module 15 shown in FIG. 8 including structures of the resistor R and the capacitor C, the display panel 10 further includes a base substrate 011 and functional film layers stacked on one side of the base substrate 011. The capacitor C includes a first electrode layer and a second electrode layer. Optionally, functional film layers configured to form the second electrode layer can be arranged on a same layer as at least part of the functional film layers configured to form the power signal line 11 or the resistor R and can be distinguished from functional film layers configured to form the first electrode layer. Alternatively, the functional film layers configured to form the second electrode layer are additional functional film layers that is independent from the conductive layers shown in FIG. 9 and is additionally arranged to form the capacitor C in the optional load module 15, which is not limited herein.

Exemplarily, the functional film layers can be the conductive layers described above.

The functional film layers configured to form the power signal line 11 can be at least one of the conductive layers described above, and the functional film layers configured to form the resistor R can be at least one of the conductive layers described above. The functional film layer configured to form the first electrode layer can be at least one layer of the conductive layers described above. At least part of the functional film layers configured to form the resistor R and the functional film layers configured to form the power signal line 11 are arranged on a same layer. And/or, at least part of the functional film layers configured to form the first electrode layer and the functional film layers configured to form the power signal line 11 are arranged on a same layer.

Exemplarily, the functional film layers configured to form the power signal line 11 includes at least one of the reflective metal layer 022, the capacitor metal layer 017 and the second metal layer 019. The resistor R can be arranged in the reflective metal layer 022, and the first electrode layer can be arranged in the capacitor metal layer 017.

Or exemplarily, number of the functional film layers configured to form the power signal line 11 and number of the functional film layer configured to form the resistor R are the same, and positions of the film layers configured to form the power signal line 11 relative to the base substrate 011 and positions of the film layers configured to form the resistor R relative to the base substrate 011 are same. And/or, number of the functional film layers configured to form the power signal line 11 and number of the functional film layer configured to form the first electrode layer are same, and positions of the film layers configured to form the power signal line 11 relative to the base substrate 011 and positions of the film layers configured to form the first electrode layer are same.

Therefore, by arranging at least part of the film layer shared between the resistor R, the capacitor C and the power signal line 11, the film layers can be fully utilized, which is conducive to ensuring that an overall number of film layers of the display panel is small, thereby reducing number of corresponding processes.

In some embodiments, the capacitor C can also share at least part of the film layers with storage capacitors, that is, the first metal layer 015 and the capacitor metal layer 017 in FIG. 9 can be used, which is not limited herein.

Figure 10:
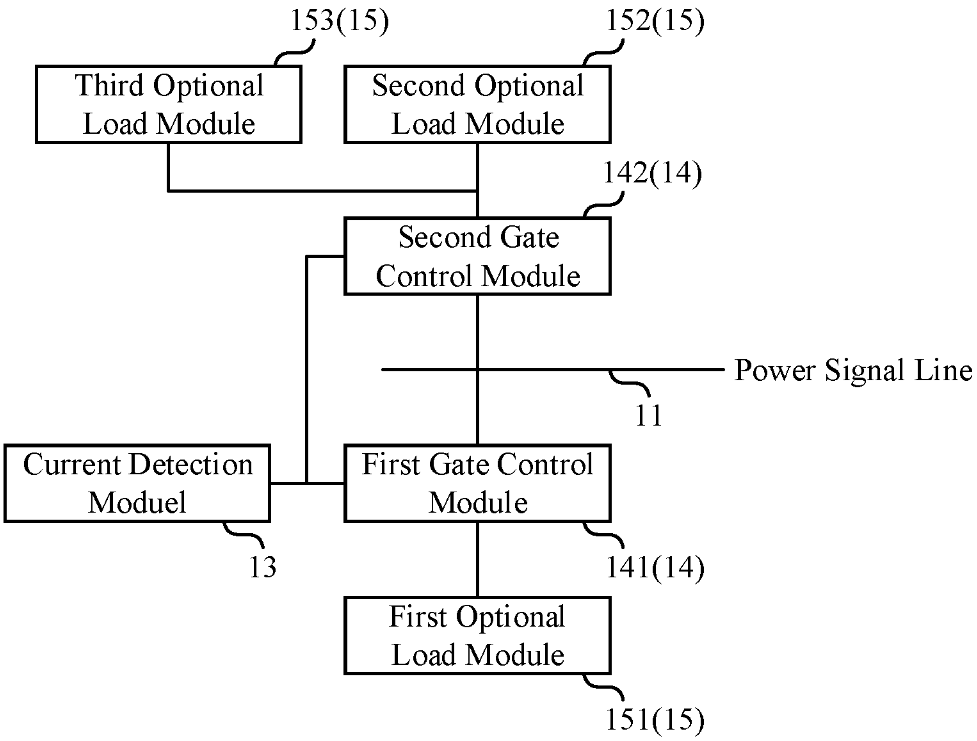
FIG. 10 illustrates another schematic diagram of a display panel consistent with various embodiments of the present disclosure.
Figure 11:
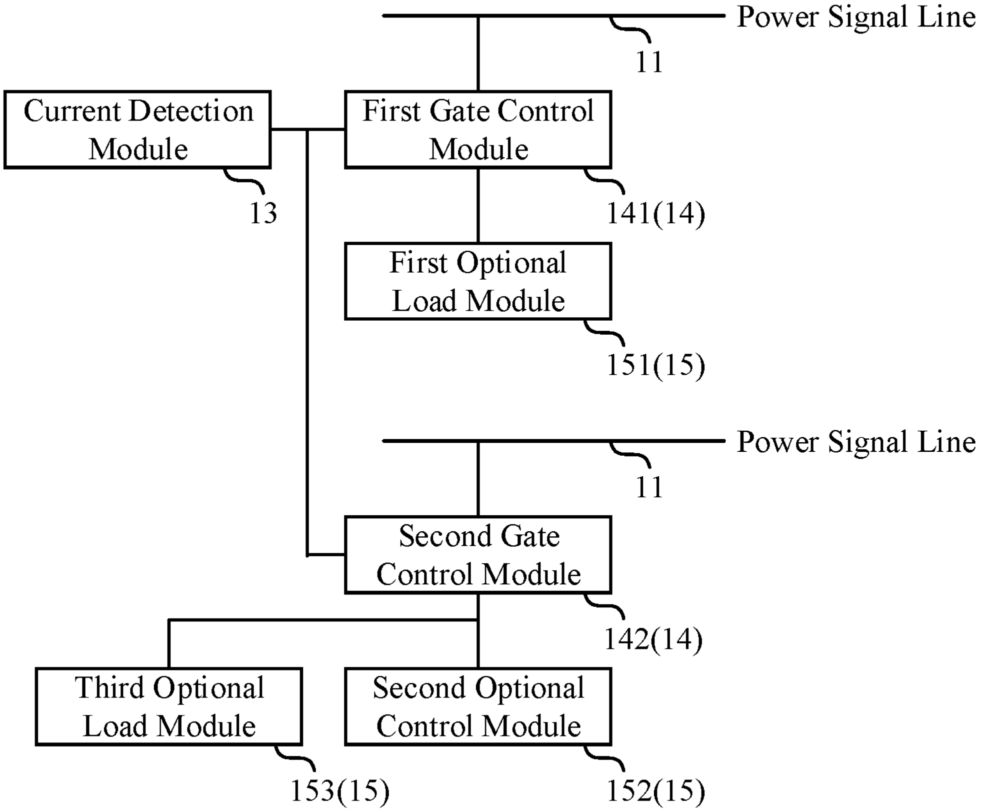
FIG. 11 illustrates another schematic diagram of a display panel consistent with various embodiments of the present disclosure.

FIG. 10 illustrates another schematic diagram of a display panel consistent with various embodiments of the present disclosure. FIG. 11 illustrates another schematic diagram of a display panel consistent with various embodiments of the present disclosure. In some embodiments, referring to FIG. 10 and FIG. 11, number of gate control modules 14 is at least one, and number of optional load module 15 is at least one. One gate control module 14 is connected to at least one optional load module 15. All gate control modules 14 are connected to current detection module 13.

Exemplarily, in FIG. 10 and FIG. 11, there are two gate control modules 14, which are respectively shown as a first gate control module 141 and a second gate control module 142. There are three optional load modules 15, which are respectively shown as a first optional load module 151, a second optional load module 152 and a third optional load module 153. Exemplarily, in FIG. 10, two different gate control modules 14 are connected to a same position of the power signal line 11. In FIG. 11, two different gate control modules 14 are connected to different positions of the power signal line 11.

The first optional load module 151 is connected to the power signal line 11 through the gate control module one 141. The second optional load module 152 and the third optional load module 153 are both connected to the power signal line 11 through the second gate control module 142. The first gate control module 141 and second gate control module 142 are both connected to the current detection module 13.

Based on the above, when the current detection module 13 detects that the first current loaded to the power signal line 11 is less than the set threshold, a target control signal is sent to the first gate control module 141 and the second gate control module 142. The first gate control module 141 is turned on based on the target control signal, and the first optional load module 151 is connected to the power signal line 11. The second gate control module 142 is turned on based on the target control signal and the second optional load module 152 and the third optional load module 153 are connected to the power signal line 11.

In other embodiments, number of optional load modules 15 can also be 1, 2, 3 or more, and number of gate control modules 14 can also be 1, 2, 3 or more. The gate control modules 14 and the optional load modules 15 can be connected one-to-one or one-to-many, which is not limited herein.

In the display panel provided by one embodiment, by arranging number of gate control modules to at least one, number of optional load modules is at least one and one gate control module is connected to at least one optional load module, all gate control modules are connected to the current detection module, so that both the gate control modules and the optional load modules can be arranged in a centralized manner or in a decentralized manner, which improves a flexibility of module arrangement and is conducive to being applicable to display panels of different structural forms.

In the above implementation, when number of gate control modules 14 is at least two, controlled switches in different gate control modules 14 can be in a same functional film layer, or in different functional film layers, which is not limited herein.

Similarly, when number of optional load modules 15 is at least two, resistors in different optional load modules 15 can be in a same functional film layer or in different functional film layers. Capacitors in different optional load modules 15 can be in a same functional film layer or in different functional film layers.

In some implementations, all gate control modules 14 are turned on or turned off synchronously.

Specifically, when number of gate control modules 14 is at least two, all gate control modules 14 are controlled by the current detection module 13 and are synchronously turned on or synchronously turned off, to realize that when the first current detected by the current detection module 13 is less than the set threshold, all the optional load modules 15 are connected to the power signal line 11 synchronously. Or when the current detected by the current detection module 13 is equal to or greater than the set threshold, the optional load modules 15 are not connected to the power signal line 11, to realize a synchronous control of connections of all the optional load modules 15.

In some embodiments, when number of the gate control module 14 is one, and all corresponding optional load modules 15 are connected to the gate control module 14, connections between all optional load modules 15 and the power signal line 11 are controlled through the gate control module 14.

In the above implementation, a conduction control signal configured to control the conduction of the gate control module 14 may be a continuous conduction signal or a segmented conduction signal, which is not limited herein. Exemplarily, the continuous conduction signal may be a continuous low-level signal or a continuous high-level signal, and a segmentally conducting signal may be a high-low switching signal, which is not limited herein.

In some embodiments, number of the optional load modules 15 is at least two. The optional load modules 15 are connected to a circuit corresponding to the power signal line 11 at preset intervals.

Specifically, when number of the optional load modules 15 is one, the optional load module 15 can be arranged at any position on the circuit corresponding to the power signal line 11. When number of optional load modules 15 is two, as long as the optional load modules are connected to the circuit corresponding to the power signal line 11, the optional load modules can be connected to the circuit corresponding to the power signal line 11 at equal intervals or unequal intervals, which is not limited herein, thereby improving layout flexibility.

Figure 12:
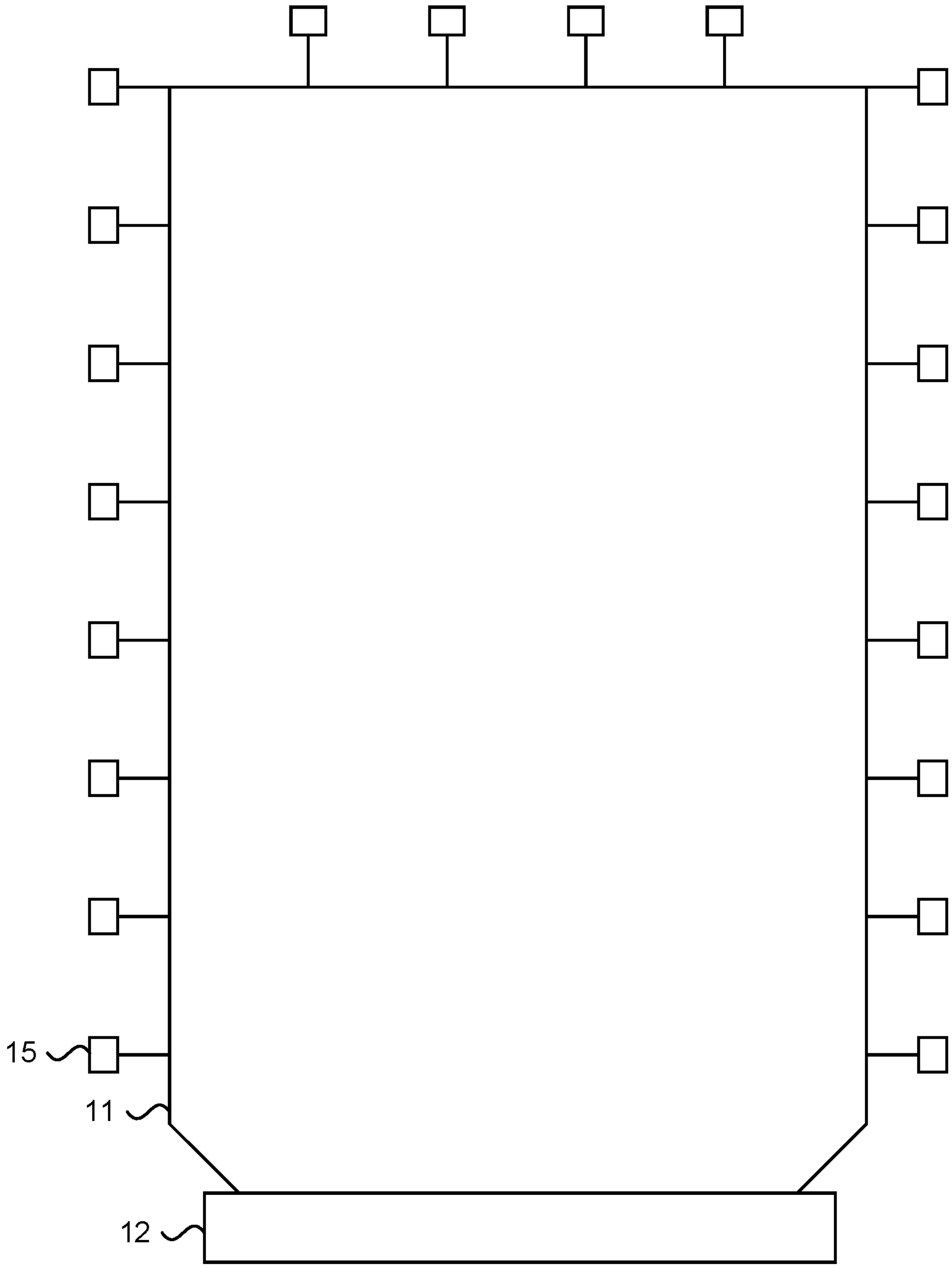
FIG. 12 illustrates another schematic diagram of a display panel consistent with various embodiments of the present disclosure.

FIG. 12 illustrates another schematic diagram of a display panel consistent with various embodiments of the present disclosure. Referring to FIG. 12, in some implementations, the optional load modules 15 are evenly distributed on the circuit corresponding to the power signal line 11.

Specifically, when number of the optional load modules 15 is at least two, different optional load modules 15 are evenly distributed on the circuit corresponding to the power signal 11 at equal intervals, thereby avoiding a centralized distribution of capacitors and resistors in the optional load modules 15 is avoided, but making the capacitors and resistors in different optional load modules 15 are evenly distributed, which reduces a difficulty of arranging resistors and capacitors, and facilitates design and production.

Exemplarily, FIG. 12 shows that two ends of the power signal line 11 are connected to the power management chip 12. In other embodiments, only one end of the power signal line 11 can be connected to the power management chip 12, the optional load modules 15 can be connected to the power signal line 11 at equal intervals to achieve even distribution.

In other embodiments, if a layout space is sufficient, the optional load modules 15 can be arranged on the circuit corresponding to the power signal line, and a specific position is not limited herein.

Figure 13:
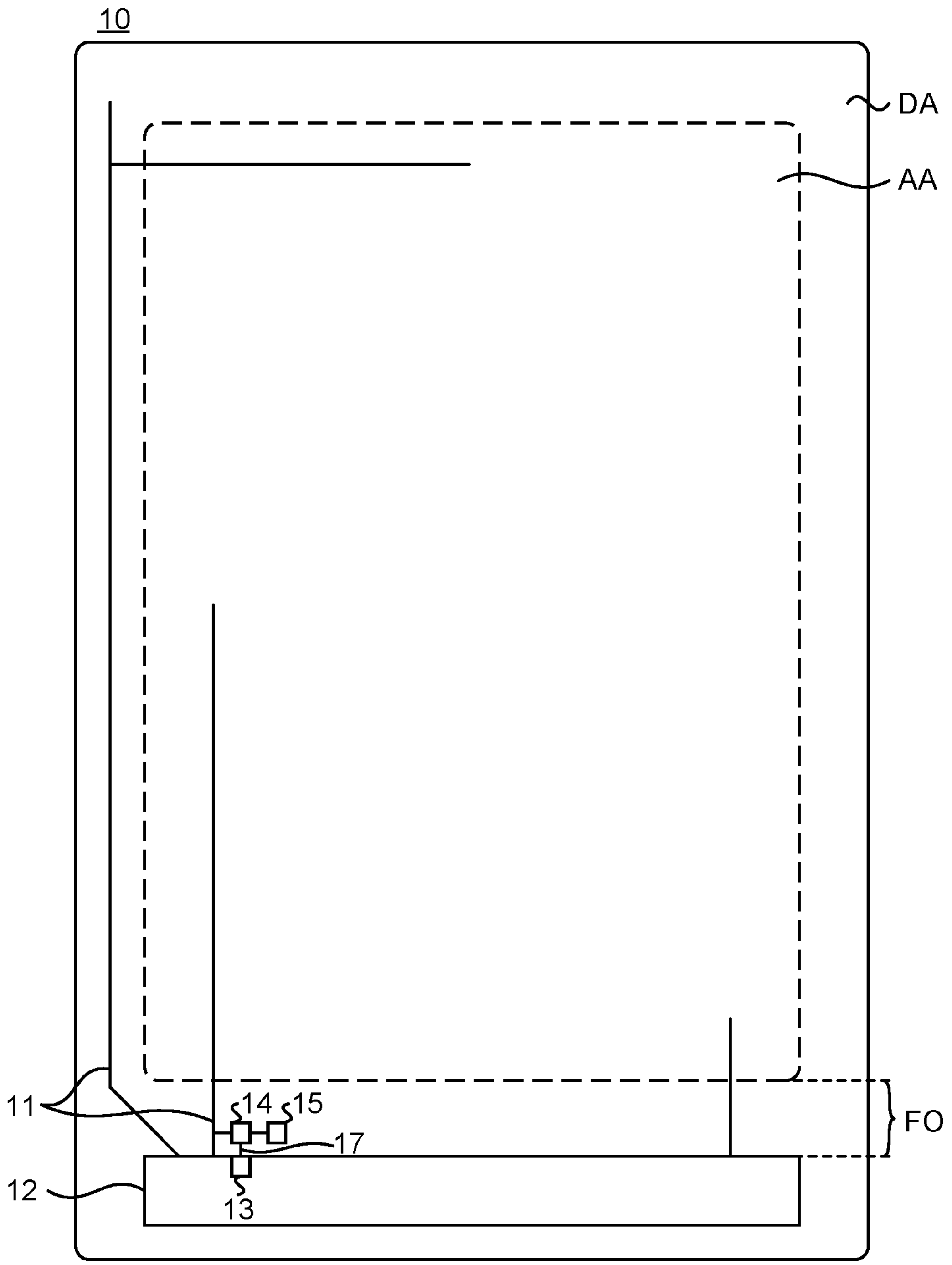
FIG. 13 illustrates another schematic diagram of a display panel consistent with various embodiments of the present disclosure.

FIG. 13 illustrates another schematic diagram of a display panel consistent with various embodiments of the present disclosure. Referring to FIG. 13, in some implementations, the display panel 10 includes a display area AA and a non-display area DA on at least one side of the display area AA. The non-display area DA is arranged with a fan-out area FO on one side of the display area AA. As shown in FIG. 13, the non-display area DA below the display area AA is arranged as the fan-out area FO.

The power signal line 11 extends from the display area AA and passes through the fan-out area FO. The gate control module 14 and the optional load module 15 are arranged in the fan-out area FO, and the gate control module 14 is connected to the current detection module 13 through a wire 17.

Exemplarily, as shown in FIG. 13, the power signal line 11 is led out from the power management chip 12, passes through the fan-out area FO upwards, and extends to the display area AA. Alternatively, the power signal line 11 passes upward through the fan-out area FO and extends to the non-display area DA on the left and right sides, and further extends to the display area AA.

Based on the above, the gate control module 14 and the optional load module 15 can be arranged in the fan-out area FO, that is, the gate control module 14 and the optional load module 15 are arranged in the fan-out area FO, and the gate control module 14 is connected to the current detection module 13 through the wire 17, thereby being controlled by the current detection module 13 to realize turning-on and turning-off controls. Furthermore, when the current detection module 13 detects that the first current is less than the set threshold, the optional load module 15 is connected to the power signal line 11.

The above arrangement can avoid an influence on a circuit layout in the display area AA.

Exemplarily, as shown in FIG. 13, in the display panel 10, the gate control module 14 and the optional load module 15 are only arranged at one position, so that less space in the fan-out area FO can be occupied. In other embodiments, the gate control module 14 and the optional load module 15 can also be arranged at a plurality of different positions in the fan-out area FO, to achieve a better effect of improving the display ripples, which is not limited herein.

In the above embodiments, the power signal line may be a signal line for transmitting OLED cathode signals. In the fan-out area FO, the power signal line can be interspersed between the capacitor metal layer and the cathode metal layer. A conductive layer (e.g., ITO layer) overlapping a metal layer in an original functional layer can be arranged in a blank area to form a capacitor C together with the metal layer in the original functional layer in the display panel. The resistor R can be arranged as a thin wire separately arranged in at least one wire layer. The resistor R and the capacitor C are connected in parallel, and one end of a via hole is connected to the controlled switch transistor, and the other end can be grounded.

In the above implementation, the wires 17 are connected to the display driving circuit. A connection between a wire 17 and the display driving circuit can be realized by running an ITO wire on the display panel to extract a COP Bonding Pin (bonding pin).

In some embodiments, referring to FIG. 9 and the above description about FIG. 9, the display panel 10 further includes a base substrate 011 and functional film layers stacked on one side of the base substrate 011. At least part of functional film layers configured to form the wire 17 and the functional film layers used to form the power signal line 11 are arranged on a same layer. Alternatively, the functional film layers configured to form the wire 17 includes at least a transparent oxide conductive layer, and the functional film layers configured to form the power signal line 11 includes at least a metal conductive layer.

Specifically, the functional film layers forming the power signal line 11 may be at least one conductive layer in the display panel, such as at least one metal layer. The functional film layers configured to form the wire 17 can also be at least one conductive layer in the display panel, such as at least one metal layer or transparent oxide conductive layer (e.g., ITO layer). The conductive layers corresponding to the power signal line 11 and the wire 17 can be same, partially same, or completely different, and can be flexibly arranged based on requirements of the display panel, which is not limited herein.

Figure 14:
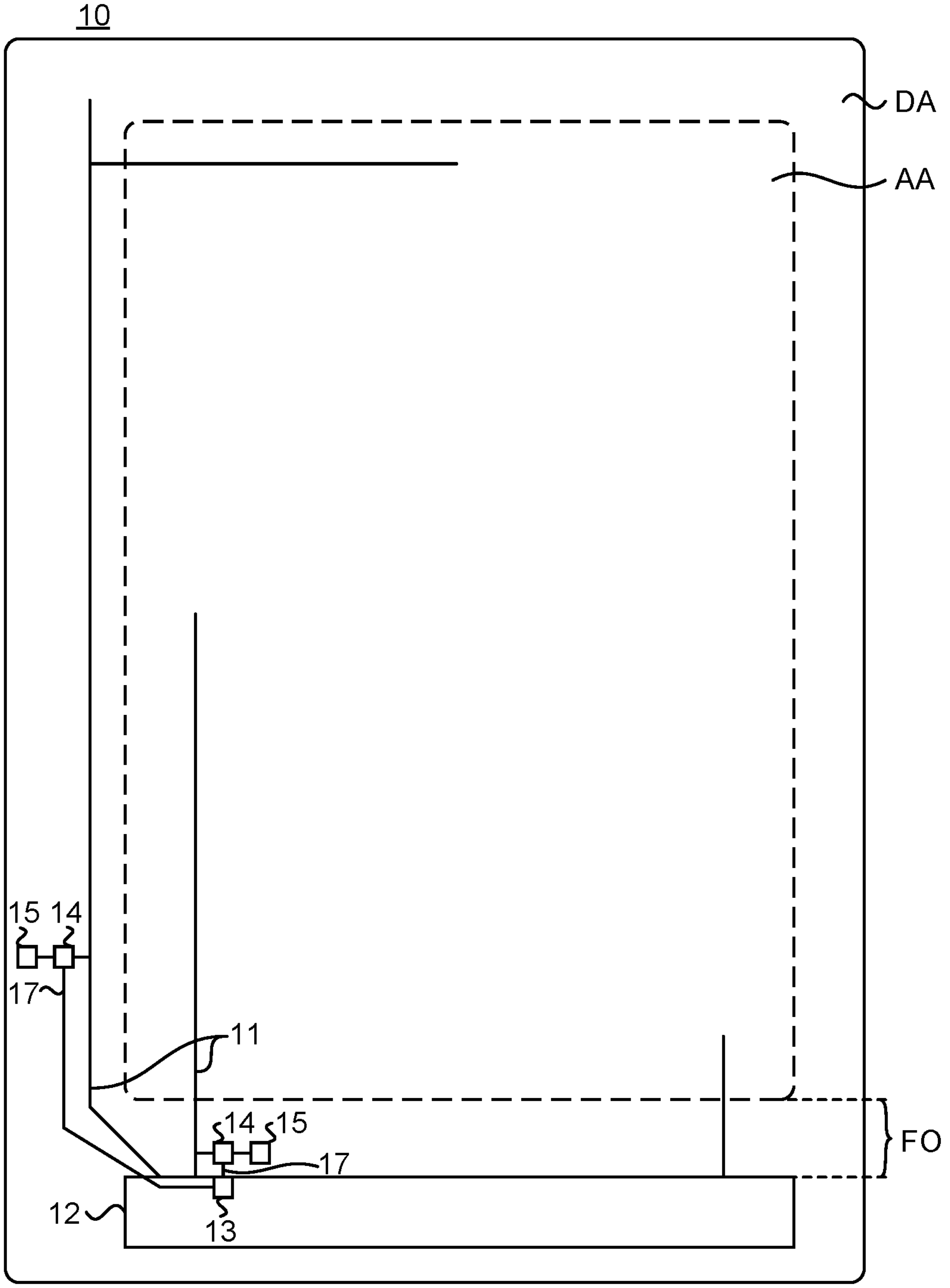
FIG. 14 illustrates another schematic diagram of a display panel consistent with various embodiments of the present disclosure.
Figure 15:
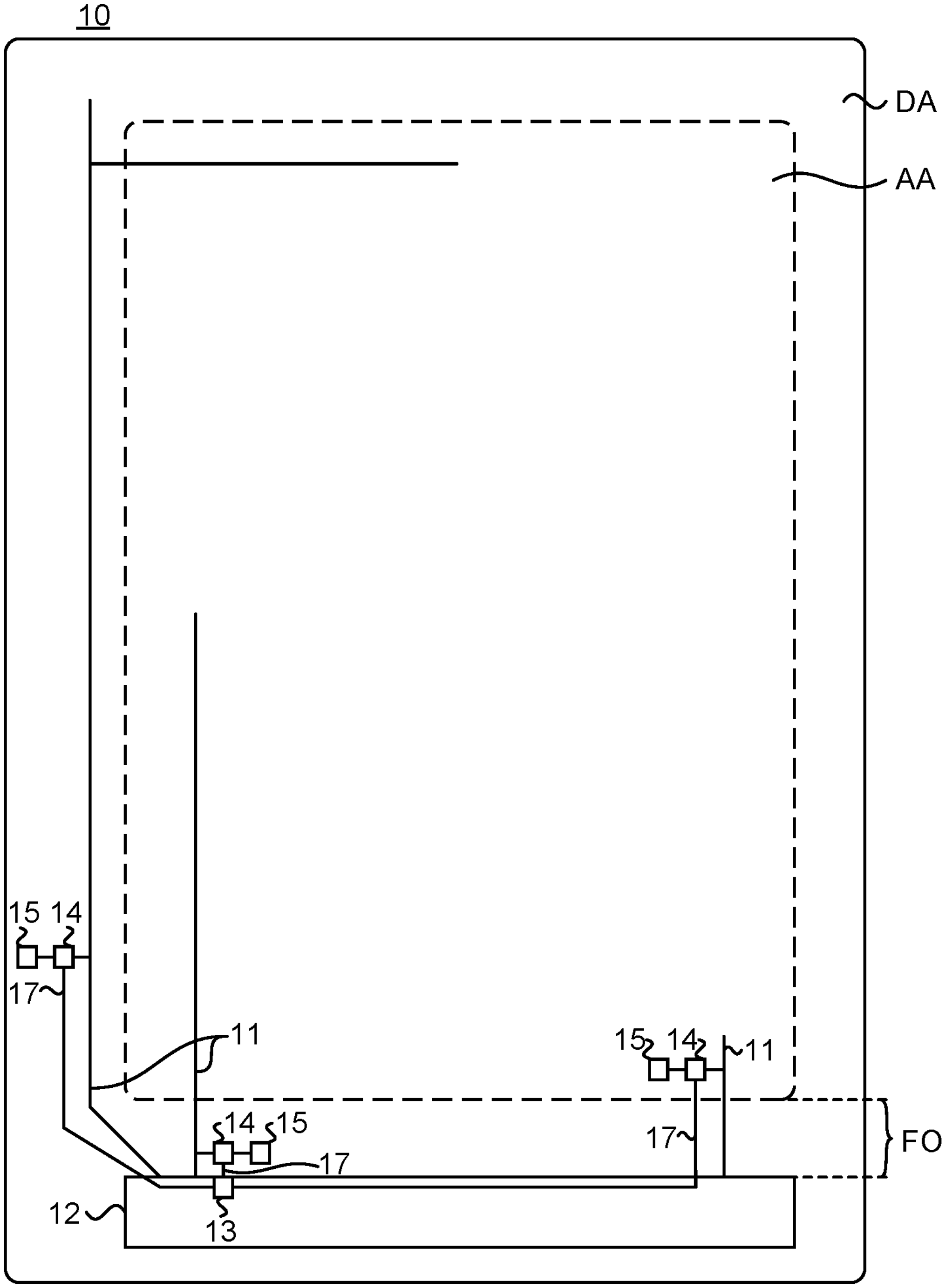
FIG. 15 illustrates another schematic diagram of a display panel consistent with various embodiments of the present disclosure.

FIG. 14 illustrates another schematic diagram of a display panel consistent with various embodiments of the present disclosure. FIG. 15 illustrates another schematic diagram of a display panel consistent with various embodiments of the present disclosure. Referring to FIG. 14 and FIG. 15, in some embodiments, the display panel 10 also includes a display area AA and a peripheral circuit area at least one side of the display area AA. For example, as shown in FIG. 14 or FIG. 15, the non-display area DA on the left and right of the display area AA is arranged as a peripheral circuit area.

The power signal line 11 is distributed in the display area AA and the non-display area DA. At least part of the power signal line 11 can extend from the display area AA to the non-display area DA and pass through the peripheral circuit area. The gate control module 14 and the optional load module 15 are arranged in the display area AA, and/or the gate control module 14 and the optional load module 15 are arranged in the peripheral circuit area. A gate control module 14 is connected to the current detection module 13 through the wire 17.

The power signal line 11 is distributed in the display area AA and extend through the peripheral circuit area and/or the fan-out area FO to connect to the power management chip 12. The power management chip 12 supplies power to electric components in the display area AA through the power signal line 11. Specifically, the power management chip 12 outputs an electrical signal, and transmits the electrical signal to a power-consuming element in the display area AA, such as an OLED, through the power signal line 11, so that the OLED emits light using the electrical signal.

In the display panel 10 provided by one embodiment, the gate control module 14 and the optional load module 15 can also be arranged in the peripheral circuit area and/or the display area AA, as long as when the first current on the power signal line 11 is less than the set threshold, the gate control module 14 can be controlled to be turned on to connect the optional load module to the power signal line 11 in the circuit connected to the corresponding power signal line 11. Therefore, a layout flexibility of the gate control module 14 and the optional load module 15 is high, which is conducive to being applied to display panels with different structural forms.

In other embodiments, the gate control module 14 and the optional load module 15 may be arranged in at least one of the fan-out area FO, the peripheral circuit area, and the display area AA, which is not limited herein.

In some embodiments, referring to FIG. 9 and the above description about FIG. 9, the display panel 10 further includes a base substrate 011 and a functional film layer stacked on one side of the base substrate 011. At least part of the functional film layers configured to form the wire 17 and the functional film layers configured to form the power signal line 11 is arranged on a same layer. Alternatively, the functional film layers configured to form the wire 17 includes at least a transparent oxide conductive layer, and the functional film layers configured to form the power signal line 11 includes at least a metal conductive layer.

Specifically, the functional film layers forming the power signal line 11 may be at least one conductive layer in the display panel, such as at least one metal layer. The functional film layer configured to form the wire 17 can also be at least one conductive layer in the display panel, such as at least one metal layer or transparent oxide conductive layer (e.g., ITO layer). The conductive layers corresponding to the power signal line 11 and the wire 17 can be same, partially same or completely different, and can be flexibly arranged based on requirements of the display panel, which is not limited herein.

Figure 16:
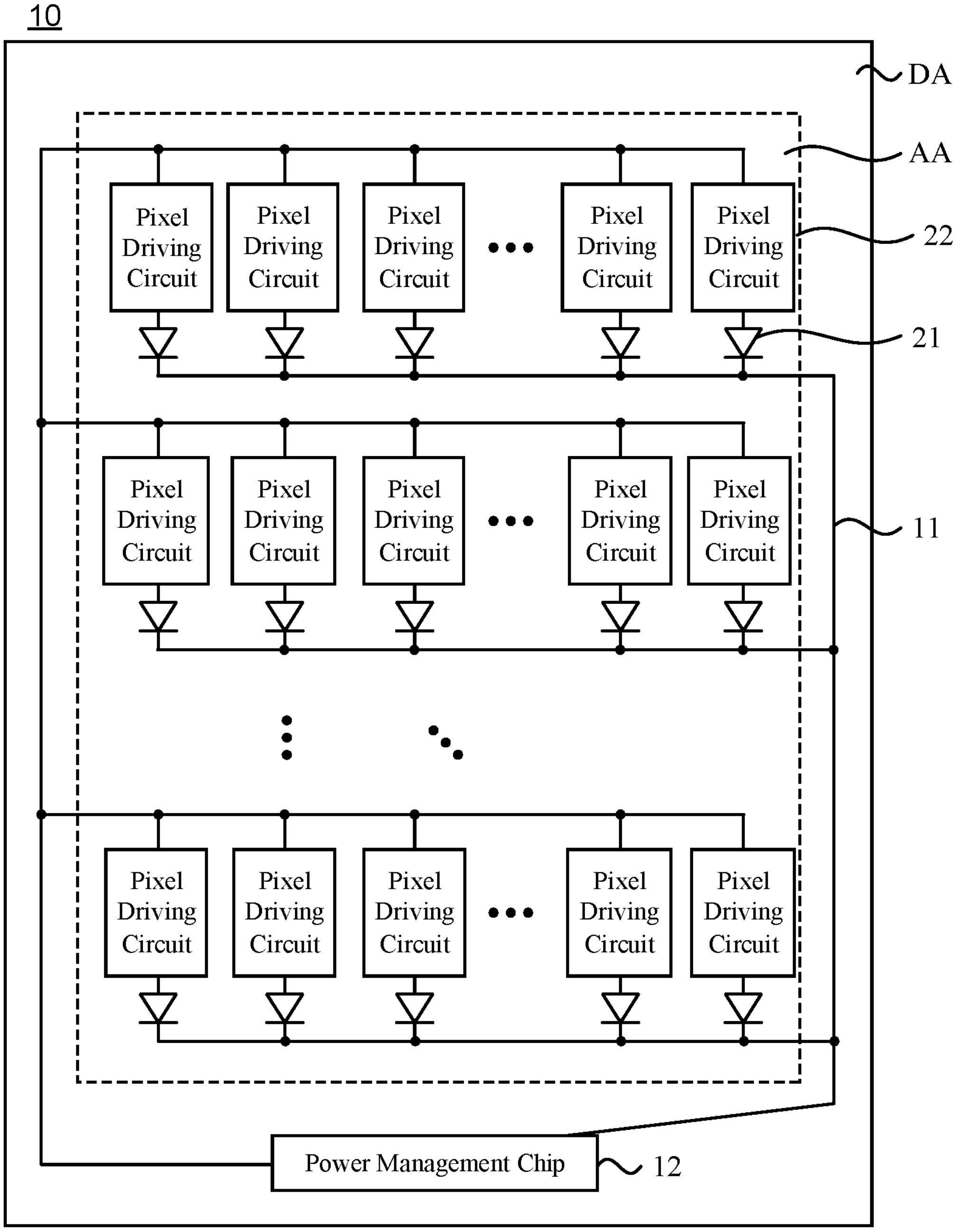
FIG. 16 illustrates another schematic diagram of a display panel consistent with various embodiments of the present disclosure.

FIG. 16 illustrates another schematic diagram of a display panel consistent with various embodiments of the present disclosure. In some embodiment, referring to FIG. 16, the display panel 10 also includes light emitting elements 21 and pixel driving circuits 22. A light emitting element 21 includes an anode and a cathode, A pixel driving circuit 22 is connected to the anode of the light emitting element 21, and the power signal line 11 is connected to cathodes of the light emitting elements 21. Exemplarily, the light emitting elements may be organic light-emitting diode elements.

The power signal line 11 is configured to provide a low potential power signal to the cathodes of the light emitting elements 21, e.g., PVEE.

Specifically, in a related art, when the power management chip 12 enters a low-frequency light-load mode, that is, when the first current loaded on the corresponding power signal line 11 is less than the set threshold, voltage ripples occur on the low-potential power signal line, leading to brightness fluctuations in a light-emitting element and causing display ripples. Therefore, in the embodiment, by connecting the gate control module 14 and the optional load module 15 on the low potential power signal line, the gate control module 14 can be controlled to be turned on when the current detection module 13 detects that the first current loaded on the power signal line is less than the set threshold, so that the optional load module 15 is connected to the power signal line, thereby avoiding entering the light-load mode, avoiding voltage fluctuations on the power signal line, and improving display ripple linearity.

Based on the above implementation, one embodiment further provides a display module, which includes any display panel provided by the above embodiments and can achieve corresponding beneficial effects.

Exemplarily, the display module can be applied to display devices such as mobile phones and tablet computers, which is not limited herein.

Figure 17:
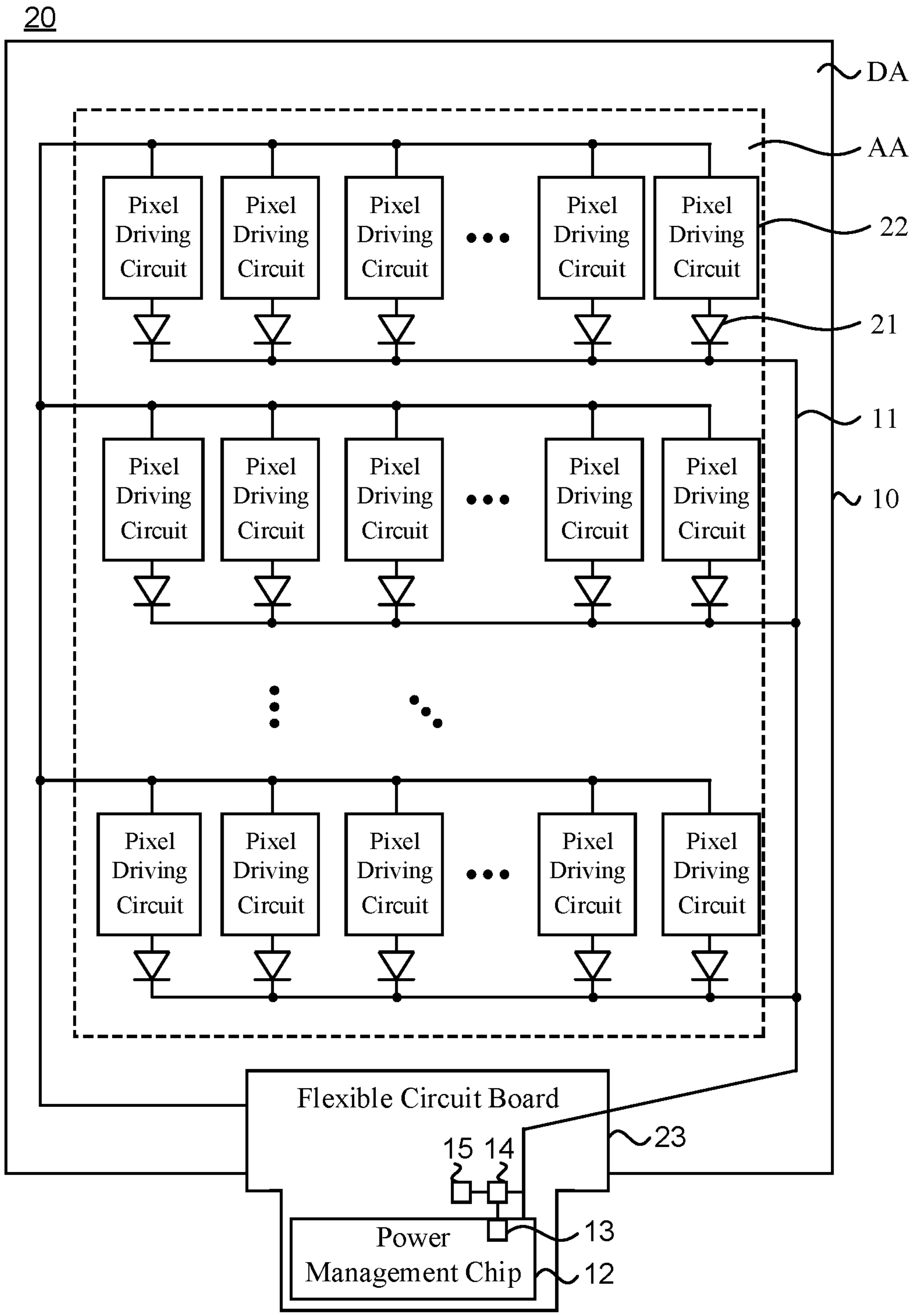
FIG. 17 illustrates a schematic diagram of a display module consistent with various embodiments of the present disclosure.
Figure 18:
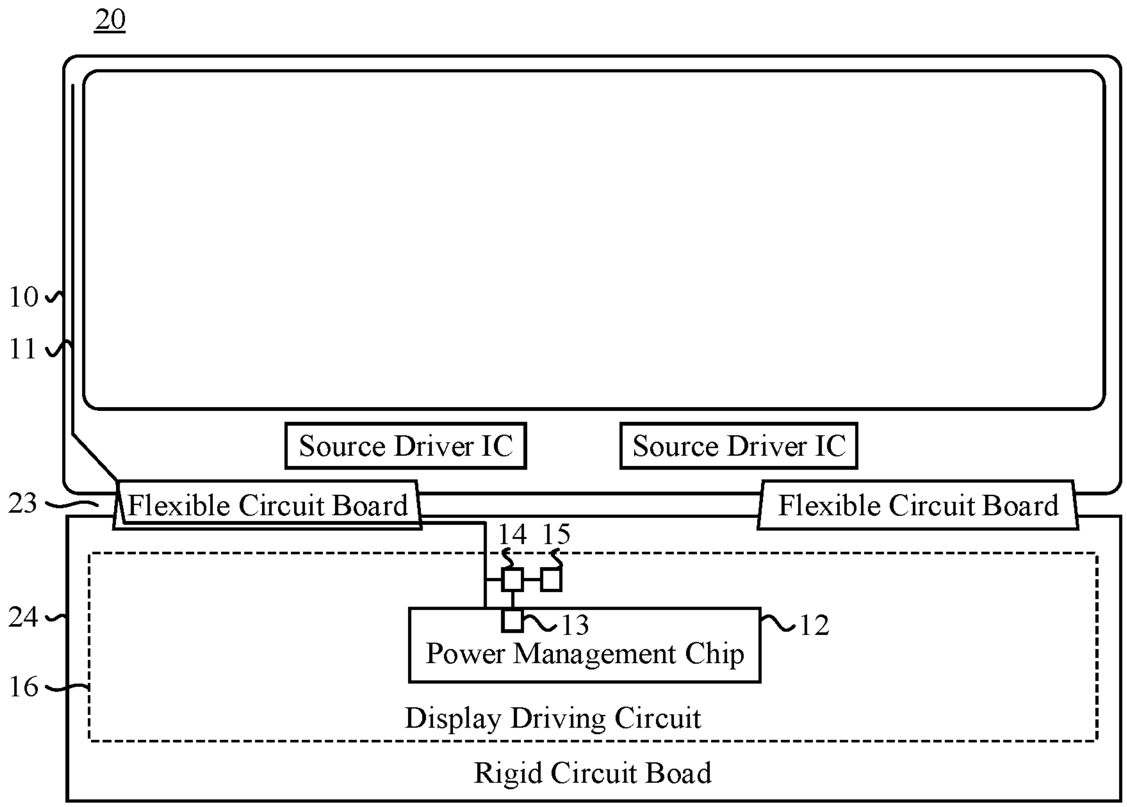
FIG. 18 illustrates another schematic diagram of a display module consistent with various embodiments of the present disclosure.

FIG. 17 illustrates a schematic diagram of a display module consistent with various embodiments of the present disclosure. FIG. 18 illustrates another schematic diagram of a display module consistent with various embodiments of the present disclosure. Referring to FIG. 17 and FIG. 18, in some embodiments, a display module 20 also includes flexible circuit boards 23 and a rigid circuit board 24 electrically connected to the display panel 10 through the flexible circuit boards 23. The power signal line 11 is connected to the rigid circuit board 24 via the flexible circuit boards 23. The gate control module 14 and the optional load module 15 are arranged on the flexible circuit boards 23, And/or, the gate control module 14 and the optional load module 15 are arranged on the rigid circuit board 24.

Exemplarily, referring to FIG. 17, the power management chip 12 is arranged in a flexible circuit board 23, the power signal line 11 is connected to the power management chip 12 in the flexible circuit board 23, and extends from the flexible circuit board 23 to the display panel 10, passes through the non-display area DA of the display panel 10, and disperse into the display area AA of the display panel 10, and finally connect the light-emitting elements 21 shown in FIG. 17, or connect the light-emitting elements via the pixel driving circuits 22 in the display area AA 21 (not shown).

Based on the above structure, the gate control module 14 and the optional load module 15 are arranged in the circuit corresponding to the power signal line on the flexible circuit board 23, or in the non-display area DA and/or the display area AA of the display panel 10. The gate control module 14 and the optional load module 15 can be flexibly arranged based on requirements of the display module 20, which is not limited herein.

In the display module 20 provided in the embodiment, by arranging the gate control module 14 and the optional load module 15 on the flexible circuit board 23 without adjusting an internal structure of the display panel 10 and changing a wiring layout of the display panel 10, an applicability to display panels 10 with different structures is high.

Exemplarily, referring to FIG. 18, the power management chip 12 is arranged in the rigid circuit board 24. The power signal line 11 is connected to the power management chip 12 in the rigid circuit board 24. extends from the rigid circuit board 24 to the display panel 10 through flexible circuit boards 23, passes through the non-display area DA of the display panel 10, disperses into the display area AA of the display panel 10, and connects to the light-emitting elements 21, or connects to the light-emitting element 21 via the pixel driving circuits 22 in the display area AA.

Based on the above structure, the gate control module 14 and the optional load module 15 are arranged in the circuit corresponding to the power signal line. For example, on the flexible circuit boards 23 and/or the rigid circuit board 24, or in the non-display area DA and/or the display area AA of the display panel 10. The gate control module 14 and the optional load module 15 can be flexibly arranged based on requirements of the display module 20, which is not limited herein.

In the display module 20 provided in the embodiment, by arranging the gate control module 14 and the optional load module 15 on the flexible circuit boards 23 and/or the rigid circuit board 24 without adjusting an internal structure of the display panel 10, and changing a wiring layout of the display panel 10, an applicability to display panels 10 with different structures is high.

In the above implementation, the flexible circuit boards 23 may be flexible printed circuit boards (FPCBs), and the rigid circuit board 24 may be a rigid printed circuit board (PCB).

Based on the above implementations, one embodiment further provides a driving method, which is applied to any display panel provided in the above implementations and achieves corresponding beneficial effects. Specifically, a current detection module can be configured to detect a first current loaded on a power signal line. when the first current is detected to be less than a set threshold, a gate control module is controlled to be turned on to connect an optional load module to the power signal line, thereby increasing a load, preventing the power management chip from entering the PFM mode, further avoiding display ripples, and improving a display effect.

Figure 19:
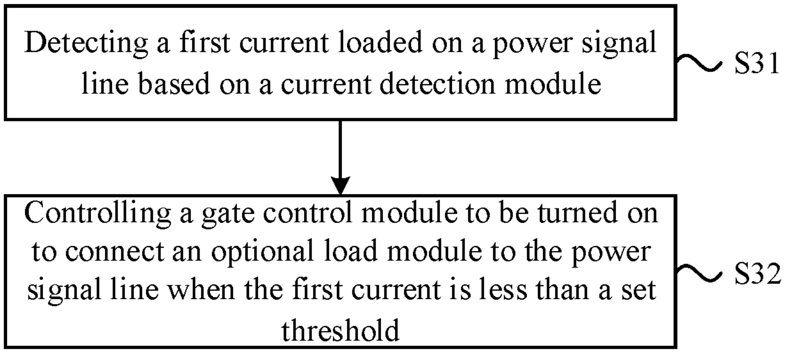
FIG. 19 illustrates a flow chart of a driving method consistent with various embodiments of the present disclosure.

FIG. 19 illustrates a flow chart of a driving method consistent with various embodiments of the present disclosure. Referring to FIG. 19, in some embodiments, the driving method includes the following steps.

S31: detecting a first current loaded on a power signal line based on a current detection module.

The current detection module detects the first current loaded on the power signal line and performs subsequent controls according to the detected first current.

S32. controlling a gate control module to be turned on to connect an optional load module to the power signal line when the first current is less than a set threshold.

When the first current is less than the set threshold, a voltage on the power signal line may fluctuate. To avoid fluctuations, the control gate control module is turned on to connect the optional load module to the power signal line, thereby preventing the power management chip from entering a PFM mode, thereby avoiding voltage fluctuation on the power signal line, improving a display ripple phenomenon, and a display effect.

In some implementations, controlling the gate control module to be turned on when the first current is less than the set threshold may specifically include: generating a first control signal when the first current is less than a set threshold; and controlling the gate control module to be turned on based on the first control signal. The first control signal may be a conduction control signal.

In the embodiment, when the first current is less than the set threshold, a conduction control signal is generated to control the gate control module to be turned on. Furthermore, the optional load module is connected to the power signal line, which can increase a load on the power line and prevent the power management chip from entering the PFM mode due to light load, thereby improving the display ripple phenomenon, and the display effect.

In some embodiments, the driving method also includes controlling the gate control module to be turned on when the first current is equal to or greater than the set threshold to disconnect the optional load module and the power signal line.

When the first current is equal to or greater than the set threshold, the display panel can normally click and display. Since a load regulation is not required, the corresponding controllable gate control module is turned off, so that the optional load module and the power signal line are not connected, and the display panel can be clicked normally.

In some implementations, controlling the gate control module to be turned on when the first current is equal to or greater than the set threshold specially includes: generating a second control signal when the first current is equal to or greater than the set threshold, and controlling the gate control module to be turned off based on a second control signal. The second control signal can be a shutdown control signal.

In one embodiment, when the first current is equal to or greater than the set threshold, a shutdown control signal is generated to control a shutdown of the gate control module, so that the optional load module is not connected to the power signal line, and the display panel can be clicked normally.

In some implementations, the gate control module is a controlled switch transistor. The first control signal and the second control signal are respectively one of a first level signal and a second level signal. The first level signal is higher than the second level signal; or the first level signal is lower than the second level signal.

The first level signal and the second level signal are respectively one of a high level signal (i.e., VGH) and a low level signal (VGL), and the two signals are different. Accordingly, the controlled switch transistor is a switch transistor that is turned on at a high level and turned off at a low level; or the controlled switch transistor is a switch tube that is turned on at a low level and turned off at a high level, which can be flexibly arranged based on requirements of the display panel, display module and driving method, which is not limited herein.

As disclosed, the display panel, display module and driving method provided by the present disclosure at least realize the following beneficial effects.

The display panel provided by the present disclosure includes a power signal line and a power management chip, and a power signal line loads an electrical signal based on the power management chip. The display panel also includes a current detection module, a gate control module, and an optional load module. The gate control module is connected between the optional load module and the power signal line, and the optional load module is controlled by the gate control module and is connected to the power signal line. The current detection module is configured to detect a first current loaded on the power signal line and control the gate control module to be turned on when the first current is less than a set threshold, to connect the optional load module to the power signal line. Therefore, when the first current loaded on the power signal line is less than the set threshold, the gating module can be configured to control the optional load module to connect to the power signal line, thereby increasing a load, preventing the power management chip from entering a pulse frequency under a light display load, eliminating display ripples, and improving a display effect.

It should be noted that in the present specification, relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitations, an element defined by the phrase "comprising a . . . " does not exclude the presence of additional identical elements in the process, method, article, or apparatus comprising the said elements.

The above description is only specific implementations of the present disclosure to enable a person skilled in the art to understand and realize the present disclosure. Various modifications of the embodiments are readily apparent to a person skilled in the art, and general principles defined herein may be implemented in other embodiments without departing from the spirit or scope of the present disclosure. Therefore, the present disclosure is not intended to be limited to the embodiments presented but is to be accorded a widest scope consistent with the principles and novel features disclosed herein.

What is claimed is:

1. A display panel comprising a power management chip, a power signal line loading an electrical signal based on the power management chip, a current detection module, a gate control module, and an optional load module, wherein:

the gate control module is connected between the optional load module and the power signal line, and the optional load module is controlled by the gate control module and connected to the power signal line;

the current detection module is configured to detect a first current loaded on the power signal line and control the gate control module to be turned on to connect the optional load module to the power signal line when the first current is less than a set threshold, wherein the current detection module comprises a jig ammeter that outputs a control signal related to the first current with reference to the set threshold, to control whether the gate control module is turned on or not;

in response to connecting the optional load module to the power signal line, the power signal line increases a load and prevents the power management chip from entering a pulse frequency modulation (PFM) mode under a light image load, thereby avoiding a voltage fluctuation of the power signal, and eliminating display ripples of the display panel;

the gate control module is connected to the current detection module through a wire, a connection between the wire and the current detection module comprising running an ITO wire on the display panel to extract a bonding pin; and the power signal line is interspersed between a capacitor metal layer and a cathode metal layer.

2. The display panel according to claim 1, further comprising a display driving circuit, wherein:

the current detection module is arranged in the display driving circuit, the display driving circuit self-tests the first current loaded on the power signal line and controls the gate control module to be turned on when the first current is less than the set threshold.

3. The display panel according to claim 1, wherein:

the gate control module includes a controlled switch transistor;

a control terminal of the controlled switch transistor is connected to a control signal output by the current detection module, a first end of the controlled switch transistor is connected to the power signal line, and a second end of the controlled switch transistor is connected to the optional load module; and the controlled switch transistor is configured to be turned on under a control of a target control signal output by the current detection module, to connect the optional load module and the power signal line.

4. The display panel according to claim 1, wherein:

the optional load module includes a resistor; and one end of the resistor is connected to the gate control module, and the other end of the resistor is connected to a fixed potential.

5. The display panel according to claim 4, wherein:

the optional load module also includes a capacitor; and the capacitor is connected to the resistor in parallel.

6. The display panel according to claim 4, further comprising a base substrate and functional film layers stacked on one side of the base substrate, wherein:

at least part of functional film layers configured to form the resistor and functional film layers configured to form the power signal line is arranged on a same layer.

7. The display panel according to claim 5, wherein:

the capacitor includes a first electrode layer and a second electrode layer; and functional film layers configured to form the resistor and functional film layers configured to form the first electrode layer are respectively arranged on a same layer with at least part of the functional film layers configured to form the power signal line.

8. The display panel according to claim 1, wherein:

number of the gate control module is at least one, and number of the optional load module is at least one;

one of the at least one gate control module is connected to at least one of the at least one optional load module; and all of the at least one gate control module are connected to the current detection module.

9. The display panel according to claim 8, wherein all of the at least one gate control module are synchronously turned on or synchronously turned off.

10. The display panel according to claim 8, wherein:

number of the optional load module is at least two; and all of the at least two optional load modules are connected to a circuit corresponding to the power signal line at preset intervals.

11. The display panel according to claim 10, wherein the at least two optional load modules are evenly distributed on the circuit corresponding to the power signal line.

12. The display panel according to claim 1, further comprising a display area and a fan-out area on one side of the display area, wherein:

the power signal line extends from the display area and passes through the fan-out area; and the gate control module and the optional load module are arranged in the fan-out area, and the gate control module is connected to the current detection module through a wire.

13. The display panel according to claim 12, further comprising a base substrate and functional film layers stacked on one side of the base substrate, wherein:

at least part of functional film layers configured to form the wire and functional film layers configured to form the power signal line is arranged on a same layer; or the functional film layers configured to form the wire at least includes a transparent oxide conductive layer, and the functional film layer configured to form the power signal line includes at least a metal conductive layer.

14. The display panel according to claim 1, further comprising a display area and a peripheral circuit area on at least one side of the display area, wherein:

the power signal line is distributed in the display area and extends through the peripheral circuit area;

the gate control module and the optional load module are arranged in the display area, and/or the gate control module and the optional load module are arranged in the peripheral circuit area; and the gate control module is connected to the current detection module through a wire.

15. The display panel according to claim 14, further comprising a base substrate and functional film layers stacked on one side of the base substrate, wherein:

at least part of functional film layers configured to form the wire and functional film layers configured to form the power signal line is arranged on a same layer; or the functional film layers configured to form the wire at least includes a transparent oxide conductive layer, and the functional film layers configured to form the power signal line includes at least a metal conductive layer.

16. The display panel according to claim 1, further comprising light emitting elements and pixel driving circuits, wherein:

a light-emitting element of the light emitting elements includes an anode and a cathode, a pixel driving circuit of the pixel driving circuits is connected to the anode of the light-emitting element, and the power signal line is connected to the cathode of the light-emitting element.

17. A display module comprising a display panel comprising a power management chip, a power signal line loading an electrical signal based on the power management chip, a current detection module, a gate control module, and an optional load module, wherein:

the gate control module is connected between the optional load module and the power signal line, and the optional load module is controlled by the gate control module and connected to the power signal line;

the current detection module is configured to detect a first current loaded on the power signal line and control the gate control module to be turned on to connect the optional load module to the power signal line when the first current is less than a set threshold, wherein the current detection module comprises a jig ammeter that outputs a control signal related to the first current with reference to the set threshold, to control whether the gate control module is turned on or not;

in response to connecting the optional load module to the power signal line, the power signal line increases a load and prevents the power management chip from entering a pulse frequency modulation (PFM) mode under a light image load, thereby avoiding a voltage fluctuation of the power signal, and eliminating display ripples of the display panel;

the gate control module is connected to the current detection module through a wire, a connection between the wire and the current detection module comprising running an ITO wire on the display panel to extract a bonding pin; and the power signal line is interspersed between a capacitor metal layer and a cathode metal layer.

18. The display module according to claim 17, further comprising flexible circuit boards and a rigid circuit board, wherein:

the rigid circuit board is electrically connected to the display panel through the flexible circuit boards;

the power signal line is connected to the rigid circuit board through the flexible circuit boards;

the gate control module and the optional load module are arranged on the flexible circuit boards; and/or the gate control module and the optional load module are arranged on the rigid circuit board.

19. A driving method applied to a display panel comprising a power management chip, a power signal line loading an electrical signal based on the power management chip, a current detection module, a gate control module, and an optional load module, wherein:

the gate control module is connected between the optional load module and the power signal line, and the optional load module is controlled by the gate control module and connected to the power signal line;

the current detection module is configured to detect a first current loaded on the power signal line and control the gate control module to be turned on to connect the optional load module to the power signal line when the first current is less than a set threshold, wherein the current detection module comprises a jig ammeter that outputs a control signal related to the first current with reference to the set threshold, to control whether the gate control module is turned on or not;

in response to connecting the optional load module to the power signal line, the power signal line increases a load and prevents the power management chip from entering a pulse frequency modulation (PFM) mode under a light image load, thereby avoiding a voltage fluctuation of the power signal, and eliminating display ripples of the display panel;

the gate control module is connected to the current detection module through a wire, a connection between the wire and the current detection module comprising running an ITO wire on the display panel to extract a bonding pin; and the power signal line is interspersed between a capacitor metal layer and a cathode metal layer; and the driving method includes:

detecting the first current loaded on the power signal line based on the current detection module, and controlling the gate control module to be turned on to connect the optional load module to the power signal line when the first current is less than the set threshold.

20. The driving method according to claim 19, further comprising:

controlling the gate control module to be turned off to disconnect the optional load module and the power signal line when the first current is equal to or greater than the set threshold.

* * * * *